United States Patent
Niimi et al.

(10) Patent No.: US 9,574,111 B2
(45) Date of Patent: *Feb. 21, 2017

(54) TRANSPARENT DOUBLE-SIDED ADHESIVE SHEET FOR IMAGE DISPLAY DEVICE AND IMAGE DISPLAY DEVICE USING THE SAME

(71) Applicant: Mitsubishi Plastics, Inc., Chiyoda-ku (JP)

(72) Inventors: Kahoru Niimi, Nagahama (JP); Hidejirou Yoshikawa, Nagahama (JP); Takahisa Uchida, Nagahama (JP); Makoto Inenaga, Nagahama (JP)

(73) Assignee: MITSUBISHI PLASTICS, INC., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,759

(22) Filed: Aug. 8, 2014

(65) Prior Publication Data

US 2014/0349080 A1 Nov. 27, 2014

Related U.S. Application Data

(63) Continuation of application No. 14/371,564, filed as application No. PCT/JP2012/083919 on Dec. 27, 2012.

(30) Foreign Application Priority Data

Jan. 18, 2012 (JP) ................. 2012-007681

(51) Int. Cl.
- *B32B 3/18* (2006.01)
- *C09J 7/00* (2006.01)
- *C09J 133/08* (2006.01)

(52) U.S. Cl.
CPC ................ *C09J 7/00* (2013.01); *C09J 133/08* (2013.01); *C09J 2201/40* (2013.01);
(Continued)

(58) Field of Classification Search
CPC ................ Y10T 428/24521; Y10T 428/24612; Y10T 428/2462; Y10T 428/24959; C09J 7/00; C09J 2203/318; C09J 133/08; C09J 133/10
(Continued)

(56) References Cited

U.S. PATENT DOCUMENTS 6,635,690 B2 * 10/2003 Heilmann ............ C09D 201/08
522/111
8,715,448 B2   5/2014 Niimi et al.
(Continued)

FOREIGN PATENT DOCUMENTS

CN        101258214 A      9/2008
JP        2011-168658      9/2011
(Continued)

OTHER PUBLICATIONS

International Search Report issued Jan. 29, 2013, in PCT/JP12/083919 filed Dec. 27, 2012.
(Continued)

*Primary Examiner* — Aaron Austin
*Assistant Examiner* — Megha Gaitonde
(74) *Attorney, Agent, or Firm* — Oblon, McClelland, Maier & Neustadt, L.L.P.

(57) ABSTRACT

A novel transparent double-sided adhesive sheet for image display device is provided, that, under the constraint of holding down the thickness of the adhesive sheet to 250 μm or less, can relieve a distortion arising within the adhesive sheet after laminating even if a member has a stepped portion of 50 μm to 100 μm in height on the laminating surface.

Proposed is a transparent double-sided adhesive sheet for image display device which is used for the purpose of laminating an image display device constitutive member (Continued)

having on a laminating surface a stepped portion of 50 μm to 100 μm in height and a flat surface portion, and another image display device constitutive member, wherein a thickness of the maximum thickness portion of the adhesive sheet is 250 μm or less, and a gel fraction (a) at a position in contact with a stepped portion after laminating is 10% or greater and smaller than a gel fraction (b) at a position in contact with a flat surface portion.

5 Claims, 1 Drawing Sheet

(52) U.S. Cl.
CPC .... *C09J 2201/622* (2013.01); *C09J 2203/318* (2013.01); *C09J 2433/00* (2013.01); *G02F 2202/28* (2013.01); *Y10T 428/24521* (2015.01)

(58) Field of Classification Search
USPC ....... 428/119, 120, 141, 142, 156, 159, 161, 428/172, 174, 212, 213, 214
See application file for complete search history.

(56) References Cited

U.S. PATENT DOCUMENTS

| | | |
|---|---|---|
| 2012/0064338 A1 | 3/2012 | Niimi et al. |
| 2012/0156456 A1 | 6/2012 | Niimi et al. |
| 2012/0241071 A1 | 9/2012 | Niimi et al. |
| 2012/0328890 A1* | 12/2012 | Niimi et al. .................. 428/522 |
| 2012/0328891 A1 | 12/2012 | Suwa et al. |
| 2014/0162080 A1 | 6/2014 | Niimi et al. |
| 2014/0162081 A1 | 6/2014 | Niimi et al. |
| 2014/0168544 A1 | 6/2014 | Niimi |
| 2014/0349100 A1* | 11/2014 | Niimi et al. .................. 428/220 |
| 2015/0044423 A1* | 2/2015 | Niimi et al. .................. 428/161 |

FOREIGN PATENT DOCUMENTS

| | | | |
|---|---|---|---|
| JP | 2011-184582 | 9/2011 | |
| PL | WO 2012061032 A1 * | 5/2012 | ............. C04B 26/04 |
| TW | 201137067 | 11/2011 | |
| WO | WO 2007/029936 A1 | 3/2007 | |
| WO | WO 2010/044229 A1 | 4/2010 | |
| WO | WO 2011/112508 A1 | 9/2011 | |
| WO | WO 2011/129200 A1 | 10/2011 | |
| WO | WO 2012/032995 * | 3/2012 | |

OTHER PUBLICATIONS

U.S. Appl. No. 14/454,747, filed Aug. 8, 2014, Niimi, et al.
U.S. Appl. No. 14/428,222, filed Mar. 13, 2015, Niimi, et al.
U.S. Appl. No. 14/433,106, filed Apr. 2, 2015, Niimi, et al.
U.S. Appl. No. 14/764,780, filed Jul. 30, 2015, Niimi, et al.

* cited by examiner

TRANSPARENT DOUBLE-SIDED ADHESIVE SHEET FOR IMAGE DISPLAY DEVICE AND IMAGE DISPLAY DEVICE USING THE SAME

This application is a continuation of U.S. patent application Ser. No. 14/371,564, filed on Jul. 10, 2014, which is a National Stage entry under 35 USC 371 of PCT/JP2012/083919, filed on Dec. 27, 2012, and claims priority to Japanese Patent Application No. 2012-007681, filed on Jan. 18, 2012.

TECHNICAL FIELD

The present invention relates to a transparent double-sided adhesive sheet that can be used to laminate a constitutive member for display device. In particular, it relates to a transparent double-sided adhesive sheet that can be used suitably in order to laminate a constitutive member for display device having a stepped portion on the laminating surface, and to an image display device using the same.

TECHNICAL BACKGROUND

In recent years, in order to increase the visibility of image display devices, the gap between an image display panel such as a liquid crystal display (LCD), a plasma display (PDP) or an electroluminescence display (ELD), and a protective panel or a touch panel member disposed on the front side (viewing side) thereof, is filled with an adhesive sheet, a liquid bonding agent, or the like, to carry out suppression of reflection of incoming light or outgoing light from a displayed image at the air layer interface.

As a method that uses an adhesive for filling such a gap between constitutive members for display device, a method is known, whereby a liquid adhesive resin composition containing a UV-curable resin is filled in the gap and then illuminated with UV light to let it cure. However, such a method bears the problem that the operation when the liquid is filled being cumbersome, productivity is poor, and moreover, at locations that UV light has difficulty in reaching such as portions masked by a printed masking layer, curing the adhesive is difficult, and obtaining a stable quality is difficult.

In addition, the method of filling the gap between constitutive members for display device using an adhesive sheet is also known. For instance, as a transparent adhesive sheet that can be used suitably for laminating a transparent panel such as a protective panel or a touch panel to an image display panel, a transparent adhesive sheet is described in Patent Document 1, which is a adhesive sheet having at least one or more each of a first adhesive layer and a second adhesive layer having different viscoelastic behaviors and is provided with a constitution in which these layers are layered integrally, the value of the dynamic shear storage modulus G' as measured with a temperature distribution at 1 Hz frequency being within a specific range.

A transparent double-sided adhesive sheet is described in Patent Document 2, which is a transparent double-sided adhesive sheet having a middle resin layer (A) and pressure-sensitive adhesive layers (B) as the front and back side layers, each layer being respectively a layer with one or more species of (meth)acrylic acid ester series (co)polymer as the base resin, the storage shear modulus (G'(A)) of the middle resin layer (A) at 1 Hz frequency in the 0° C. to 100° C. temperature range being higher than that of the pressure-sensitive adhesive layers (B), and, the indentation hardness (Asker C2 hardness) of the entirety of the sheet being 10 to 80.

In addition, as a thin (for instance, 30 to 50 μm-thick) adhesive sheet that is applicable onto a surface having a step or a protrusion, a UV-crosslinking adhesive sheet is described in Patent Document 3, which is a UV-crosslinking adhesive sheet comprising a (meth)acrylic copolymer of a monomer containing a (meth)acrylic acid ester having a UV-crosslinking site, the store elastic modulus of the adhesive sheet before UV-crosslinking being $5.0 \times 10^4$ Pa or greater but $1.0 \times 10^6$ Pa or lower at 30° C. and 1 Hz and $5.0 \times 10^4$ Pa or lower at 80° C. and 1 Hz, and further, the store elastic modulus of the adhesive sheet after UV-crosslinking being $1.0 \times 10^3$ Pa or greater at 130° C. and 1 Hz.

PRIOR ART REFERENCES

Patent Documents

[Patent Document 1] International publication brochure WO2010/044229
[Patent Document 2] International publication brochure WO2011/129200
[Patent Document 3] Japanese Patent Application Laid-open No. 2011-184582

SUMMARY OF THE INVENTION

Problems to be Solved by the Invention

In the field of image display devices, centered around mobile phones, mobile terminals and the like, diversification of designs has been proceeding in addition to decrease in thickness and increase in accuracy, and new problems have been arising concomitantly to this. For instance, while printing a black masking portion in the shape of a frame at the periphery of a surface protective panel is common in prior art, concomitantly to diversification of designs, forming of this frame-shaped masking portion in colors other than black has begun.

However, when forming a masking portion in a color other than black, since the masking ability is low with colors other than black, the thickness of the masking portion, that is to say, the printed portion, needs to be thick compared to when using black. Then, an adhesive sheet for laminating a constitutive member provided with such a printed portion calls for a step-following ability, which, by following a large printed step, allows for filling throughout. In addition, the thickness of the printed portion becoming large, there is the possibility that, at the portion in contact with the printed portion, the image display device becomes under large stress compared to other portions, which generates distortion and negatively affects optical properties, and thus suppressing such a distortion is also sought.

Moreover, as the decrease in thickness of the image display device is proceeding increasingly, such a problem needs to be solved without hindering a decrease in thickness.

Thus, the present invention relates to a transparent double-sided adhesive sheet for image display device that is used in order to laminate an image display device constitutive member having a stepped portion on the laminating surface, and provides a novel transparent double-sided adhesive sheet for image display device that, under the constraint of holding down the thickness of the adhesive sheet to 250 μm or less, can relieve a distortion arising within the adhesive sheet after laminating even if a member has a stepped portion of 50 μm to 100 μm in height on the laminating surface.

Means to Solve the Problems

The present invention proposes a transparent adhesive sheet for image display device, which is a transparent adhesive sheet for image display device that is used in order to laminate together an image display device constitutive member having on the laminating surface a stepped portion with another image display device constitutive member, the transparent adhesive sheet for image display device is formed by a non-solvent series adhesive composition which does not contain a solvent (also referred to as "a non-solvent series adhesive composition"), the thickness of the thickest portion of the adhesive sheet being 250 μm or less, and the gel fraction (a) at a position becoming in contact with the stepped portion when laminating being 10% or greater and smaller than the gel fraction (b) at a position becoming in contact with the flat surface portion when laminating.

In addition, in an image display device provided with at least two facing constitutive members for display device, at least one constitutive member for display device having on the laminating surface a stepped portion of 50 to 100 μm in height and a flat surface portion excluding the stepped portion, the present invention proposes an image display device provided with a constitution comprising the above transparent double-sided adhesive sheet for image display device proposed by the present invention filled in between the two constitutive members for display device.

Effects of the Invention

According to the transparent double-sided adhesive sheet proposed by the present invention, even in a case of a member having a stepped portion of 50 μm to 100 μm in height on the laminating surface of the constitutive member for display device to be laminated, by adjusting, under the constraint of holding down the thickness of the adhesive sheet to 250 μm or less, the gel fraction (a) at a position in contact with the stepped portion after laminating to be smaller than the gel fraction (b) at a position in contact with the flat surface portion, distortion arising in the portion in contact with the stepped portion can be relieved, allowing negative effects on optical properties to be suppressed. Thus, the image display device and the transparent double-sided adhesive sheet for image display device proposed by the present invention can be used suitably in image display devices for which decrease in thickness and diversification in design are advancing, for instance, personal computers (PCs), mobile data terminals (PDAs), mobile terminals such as mobile phones, gaming machines, televisions (TVs), car navigation systems, liquid crystal pen tablets, furthermore, image display terminals with a touch panel function, and the like.

EMBODIMENT FOR CARRYING OUT THE INVENTION

Hereinafter, an example of embodiment of the present invention will be described; however, the present invention is not limited to the embodiment below.
<The Present Adhesive Sheet>

The transparent double-sided adhesive sheet for image display device according to the present embodiment (hereafter referred to as "the present adhesive sheet") is a adhesive sheet that is used in order to laminate together a constitutive member for display device having on a laminating surface a stepped portion of 50 μm to 100 μm in height and another constitutive member for display device integrally, the transparent double-sided adhesive sheet being transparent and comprising both front and back sides as adhesive sides.

(Gel Fraction)

The present adhesive sheet is provided with a property that allows for letting the gel fraction after adhesion be different depending on the site within the adhesive sheet.

For instance, it is possible, after a constitutive member for display device having a stepped portion of 50 μm to 100 μm in height on the laminating surface and another constitutive member for display device have been laminated together, for the gel fraction (a) at a position in contact with the stepped portion to be rendered smaller than the gel fraction (b) at a position in contact with the flat surface portion.

Figure 1:
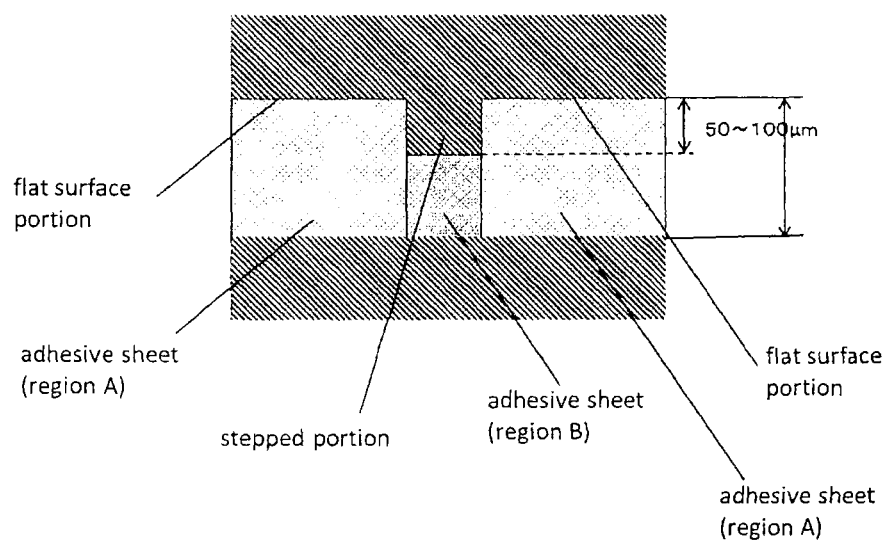
FIG. 1 Cross-sectional view showing an example of state after laminating two constitutive members for display device using a transparent double-sided adhesive sheet for image display device according to one example of the present invention.

As a more concrete example, it is possible for the gel fraction (a) of the region B within the adhesive sheet in contact with the stepped portion to be rendered smaller than the gel fraction (b) of the region A in contact with the flat surface portion, as shown in FIG. 1.

By rendering the gel fraction (a) at a position in contact with the stepped portion smaller than the gel fraction (b) at a position in contact with the flat surface portion in this way, the stress received by being compressed by the stepped portion can be relieved, allowing the distortion arising in this portion to be rendered small, thus, the difference in distortion at the position in contact with the stepped portion and the position in contact with the flat surface portion can be rendered small, allowing negative effects on optical properties to be suppressed.

From such point of view, it is desirable for the difference [(b)−(a)] between the gel fraction (a) of the under-the-step portion and the gel fraction (b) of the under-the-flat-surface portion to be 5 to 30%, of which 5% or greater or 25% or less, and, of this, 5% or greater or 20% or less in particular, is further desirable.

If the difference in gel fraction is 5% or greater, the stress received by being compressed by the stepped portion can be relieved, and the difference in distortion at the position in contact with the stepped portion and the position in contact with the flat surface portion can be rendered small. Meanwhile, if the difference in gel fraction is 30% or less, it prevents that, due to the difference in gel fraction within the adhesive sheet being too large, on the contrary, distortion arises, negatively affecting optical properties.

It is necessary for the gel fraction (a) of the position in contact with the stepped portion after laminating to be 10% or greater, of which a range of 30 to 80% is desirable to be within; of this, to be 40% or greater or 70% or less, whereof 50% or greater or 70% or less in particular, is further desirable.

If the gel fraction (a) is 10% or greater, the stress of the under-the-step portion can be relieved suitably while the shape of the adhesive sheet is being held to an extent that flowing does not occur, and if 30% or greater, a desirable adhesive force can be obtained. Meanwhile, if 70% or less, stress received by being compressed by the stepped can be relieved.

It is desirable for the gel fraction (b) of the position in contact with the flat surface portion after laminating to be within a range of 35 to 100%; of this, to be 45% or greater or 95% or less, whereof 55% or greater or 90% or less in particular, is further desirable.

If the gel fraction (b) is 35% or greater, a desirable adhesive force can be obtained.

As methods for letting the gel fraction after adhesion be different depending on the site within the adhesive sheet as described above, forming methods such as those in the following can be cited.

(1) At a stage prior to laminating of constitutive members for display device, an entire sheet of photocuring-type adhesive sheet is crosslinked (curing: primary curing) beforehand to an extent that no deformation or flow is provoked during storage while flexibility that is sufficient to have high step-following ability is maintained, concretely, in such a way that the gel fraction is within a range of 10 to 70%. Then, after laminating of the constitutive members for display device, if only the portion other than that in contact with the stepped portion, that is to say, the portion in contact with the flat surface portion, is let to crosslink (curing: secondary curing), either by irradiating a light from the exterior of the masking portion having a step such as a print-stepped portion, or, by superimposing a masking sheet so as to cover the stepped portion and irradiating light through the masking sheet, it is possible to render the gel fraction (a) at a position in contact with the stepped portion smaller than the gel fraction (b) at a position in contact with the flat surface portion, within the adhesive sheet after laminating (forming method 1).

(2) In addition, even by having a adhesive sheet A, which is a portion that enters in contact with a stepped portion, and a adhesive sheet B, which is a portion that enters in contact with a flat surface portion, prepared separately so that each is of the desired gel fraction, and, after integrating the two, laminating constitutive members for display device together, it is also possible to render the gel fraction (a) at a position in contact with the stepped portion to be smaller than the gel fraction (b) at a position in contact with the flat surface portion, within the adhesive sheet after laminating (forming method 2).

(3) Furthermore, having an entire sheet of photocuring-type adhesive sheet crosslinked (curing: primary curing) beforehand in such a way that the gel fraction is within the range of 10 to 70%, a masking sheet is superimposed so as to cover the stepped portion and light is irradiated through the masking sheet, or the like, such that only the portion other than that which is to be in contact with the stepped portion, that is to say, the portion that is to be in contact with the flat surface portion, is let to crosslink (curing: secondary curing), to have the gel fraction (a) at a position that is to be in contact with the stepped portion rendered smaller than the gel fraction (b) at a position that is to be in contact with the flat surface portion, prior to laminating of constitutive members for display device. Thereafter, constitutive members for display device may be laminated together through the adhesive sheet prepared in this way (forming method 3).

Among the above methods 1 to 3, forming method 1 is the most desirable method.

That is to say, according to forming method 1, when applying to the laminating of a constitutive member for display device having a stepped portion of 50 to 100 μm in height, by adjusting the gel fraction at the stage of primary curing by crosslinking to an extent that allows a stepped portion to be followed sufficiently and, moreover, does not render the sheet excessively flexible, sufficiently infiltrating throughout by following the stepped portion and causing no air bubble or the like to arise is possible, and, the stress due to the stepped portion can be relieved, furthermore, it is possible to prevent the problems of bubbling or peeling at the laminating interface from occurring even if the portion in contact with the stepped portion is exposed to an environment of high temperature and high humidity or exposed to a sudden temperature change.

Further in addition, by performing secondary curing after laminating to raise the gel fraction of the flat surface portion and raise the cohesive force, that is to say, the adhesive force, laminating firmly together two constitutive members for display device is possible, and manifesting excellent bubbling resistance is possible, as an entire adhesive sheet.

Forming method 1 will be described in further detail using figures.

First, the entirety of a adhesive sheet 2 is crosslinked (primary curing) beforehand in such a way that the gel fraction is 10 to 70%.

Figure 2:
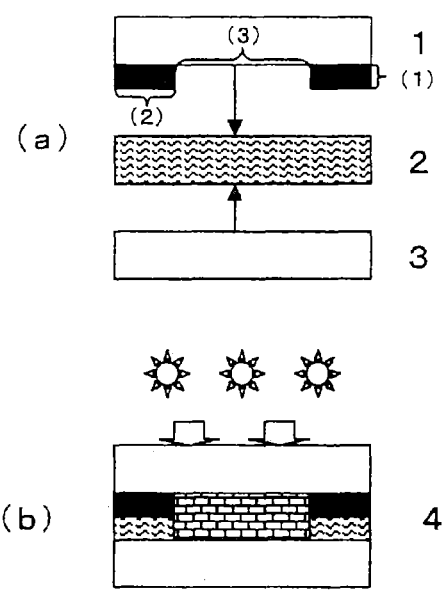
FIG. 2 Cross-sectional views showing an example of method for laminating two constitutive members for display device using a transparent double-sided adhesive sheet for image display device according to one example of the present invention: (a) is an exploded cross-sectional view showing an example of state before laminating and (b) is a cross-sectional view showing an example of state after laminating.

Next, as shown in FIG. 2(*a*), mediated by the above-mentioned adhesive sheet 2, a constitutive member 1 for display device having a print-stepped portion (1) of 50 to 100 μm in height and a constitutive member 3 for display device are layered. At this stage, since the adhesive sheet 2 is soft to a suitable degree, the step can be followed sufficiently while maintaining storage stability.

Further, such light as UV is illuminated from the exterior of the constitutive member 1 for display device (FIG. 2(*b*)). Then, since the printed step (1) blocks the light, at the portion in contact with the printed step (1), either the light does not arrive or the light that arrives is noticeably limited, whereas, at the portion in contact with the flat surface portion (3) where there is no printed step (1), the light arrives sufficiently and the crosslinking reaction of this portion proceeds which can let secondary-curing, allowing peel-resistance and bubbling resistance to be realized.

<Adhesive Composition>

An example of constitutive material that can be used suitably to form the present adhesive sheet (hereafter referred to as "the present adhesive composition") will be described. However, by all means, this is an example, and the composition is not limited to this.

As the present adhesive composition, the constitution or the like thereof is not limited in particular as long as it is one that allows for letting the gel fraction after adhesion be different depending on the site within the adhesive sheet, as described above. However, in order to realize the forming methods 1 to 3, and among these, the forming method 1, it is desirable for the composition to be a photocuring-type adhesive composition. Desirable among these are those containing a base polymer having a molecular weight of a predetermined range, a photo-crosslinking initiator and, as necessary, a crosslinking agent.

(Base Polymer)

From the point of view of adhesiveness, transparency and weather resistance, and the like, the base polymer of the present adhesive composition is preferably a (meth)acrylic acid ester series polymer (with the meaning of including copolymers, hereafter referred to as "acrylic acid ester series (co)polymer").

The acrylic acid ester series (co)polymer serving as the base resin can be prepared with physical properties such as the glass transition temperature (Tg) and the molecular weight adjusted suitably by selecting the species, composition ratio, furthermore, the polymerization conditions, and the like, of the acrylic monomer or the methacrylic monomer used in order to polymerize this [(co)polymer].

As acrylic monomers constituting the acrylic acid ester (co)polymer, for instance, 2-ethylhexyl acrylate, n-octyl acrylate, isooctyl acrylate, n-butyl acrylate, ethyl acrylate, and the like can be cited as the main raw materials.

Aside from these, a (meth)acrylic monomer having various functional groups may be copolymerized with the acrylic monomer, according to such purposes as conferring cohesive force, conferring polarity, and the like. As the (meth)acrylic monomer having functional groups, for instance, methyl methacrylate, methyl acrylate, hydroxyethyl acrylate, acrylic acid, glycidyl acrylate, N-substituted acrylamide, acrylonitrile, methacrylonitrile, fluorine-containing alkyl acrylate, organo-siloxy group-containing acrylate, and the like, can be cited.

In addition, various vinyl monomers that are copolymerizable with the acrylic monomers and the methacrylic monomers above, such as, vinyl acetate, alkylvinyl ether and hydroxy alkylvinyl ether, can also be used suitably in the polymerization.

It is desirable that the present adhesive composition is of a non-solvent series, that is to say, does not contain a solvent, is hot melt formable, and at the primary cured stage, has suitable adhesive force, and, has flexibility that allows the unevenness or a foreign substance on the adherend surface to be followed.

Whether the molecular weight of the base polymer is too large or too small, film production by hot melting is not possible. In addition, if the molecular weight of the base polymer is too small, there is the possibility that, at curing (crosslinking) prior to laminating, no adhesive force is exerted, or, being too soft, handleablity is poor; conversely, if the molecular weight is too large, becoming hard at the curing (crosslinking) prior to laminating, there is the possibility of not being able to follow the unevenness or a foreign substance on the adherend surface.

Thus, from such point of view, it is desirable to use an acrylic acid ester series (co)polymer in which the mass average molecular weight of the base polymer is 100,000 to 700,000, in particular 200,000 or greater, or 600,000 or lower, of which, in particular 250,000 or greater or 500,000 or lower.

Among these, using an acrylic acid ester series (co-)polymer which mass average molecular weight (MW)/number average molecular weight (MN) is 5 to 10, of which 6 or greater or 9 or less, is more desirable. A large mass average molecular weight/number average molecular weight means that the molecular weight distribution is broad, and if this value is as large as on the order of 5 to 10, since the low molecular weight components and the high molecular weight components respectively contribute to capabilities on par with their molecular weights, such as fluidity, wettability and cohesive force, there is a tendency for processability and adhesive capability to be better than those with narrow (homogeneous) molecular weight distributions.

(Crosslinking Agent)

As crosslinking agents used when crosslinking an acrylic acid ester series (co)polymer, for instance, multi-functional (meth)acrylates having two or more (meth)acryloyl groups are desirable.

From such point of view, the amount of crosslinking agent, with respect to 100 parts by mass of base polymer, is preferably 0 to 30 parts by mass, in particular 20 parts by mass or less, of which 10 parts by mass or less, and among these in particular 5 parts by mass or less.

(Crosslinking Initiator)

As crosslinking initiator used in the present adhesive composition, an intermolecular hydrogen-abstracting photopolymerizing initiator (also referred to as "hydrogen-abstracting photoinitiator") can be cited as a particularly desirable example.

A photopolymerization initiator generates a radical by light irradiation and becomes the starting point of the polymerization reaction in the system. The radical generation mechanisms in the (meth)acrylic acid ester and vinyl ester systems are divided broadly into two classes: the intramolecular cleavage type, in which radicals are generated by cleavage and decomposition of a single bond of the photopolymerization initiator per se, and the hydrogen-abstraction type, in which a photoexcited initiator and a hydrogen donor in the system form an excited complex, causing the hydrogen of the hydrogen donor to be transferred.

When generating radicals by light irradiation, intramolecular cleavage type initiators decompose and become different compounds, and thus, once excited, no longer have functions as reaction initiators; in contrast, for the hydrogen-abstraction type, even once excited, those among the initiators that have not reacted return to the ground state, and thus are re-usable as reaction initiators. Therefore, compared to photopolymerization initiators of the intramolecular cleavage type, photopolymerization initiators of the hydrogen-abstraction type survive readily as active species in the system even after the composition has been primary cured by UV light. Consequently, use as reaction initiators is possible when further crosslinking (secondary curing) by irradiating UV light after laminating. In addition, photopolymerization initiators of the hydrogen-abstraction type, compared to intramolecular cleavage type, are also excellent on the point that, there being little degradation products of low molecular weight, there is little generation of outgas and eluents of degradate origin.

As hydrogen-abstraction type photoinitiators, benzophenone series compounds such as, for instance, benzophenone, 4-methyl benzophenone, 2,4,6-trimethyl benzophenone, 4-phenyl benzophenone, 4-hydroxy benzophenone, 4,4'-dimethylamino benzophenone, methyl o-benzoylbenzoate and dibenzosuberone can be cited.

Further, thioxanthone series compounds such as thioxanthone, 2-chloro thioxanthone, 2-methyl thioxanthone, 2-isopropyl thioxanthone and 2,4-dimethyl thioxanthone, anthraquinone series compounds such as 2-methyl anthraquinone, 2-ethyl anthraquinone, 2-tertbutyl anthraquinone and 2-amino anthraquinone, and α-dicarbonyl series compounds, such as benzyl and camphor quinone can be cited.

These can also be used as a mixed component comprising a combination of two or more species. However, there is no limitation to the substances given above as photoinitiators of the hydrogen-abstraction type. In addition, photopolymerization initiators of the intramolecular cleavage type may be used in combination in a variety of proportions.

The amount of photopolymerization initiator added is not limited in particular, and in general is adjusted preferably in a proportion of 0.1 to 10 parts by mass, in particular 0.2 parts by mass or more or 5 parts by mass or less, and among these, 0.5 parts by mass or more or 3 parts by mass or less, with respect to 100 parts by mass of base resin. However, this range may be exceeded in balancing with other elements.

(Other)

When crosslinking an acrylic acid ester series (co)polymer, additives may be added suitably, as necessary.

<Layered Constitution>

The present adhesive sheet may be a sheet comprising a single layer or a multilayered sheet comprising two or more layers that have been layered.

When the present adhesive sheet is to be a multilayered transparent double-sided adhesive sheet, that is to say, when forming a transparent double-sided adhesive sheet with a layered constitution provided with a middle layer and outermost layers, it is desirable to form the outermost layers from the present adhesive composition described above.

(Thickness)

From the point of view of not obstructing a decrease in thickness of the image display device, it suffices for the thickness of the present adhesive sheet that the thickness of the maximum thickness portion is 250 μm or less. In other words, the present adhesive sheet may be a sheet whereof the thickness is uniform or may be a non-uniform sheet whereof the thickness is different in portions, and in the case of a sheet whereof the thickness is non-uniform, it suffices that the thickness of the portion with the largest thickness is 250 μm or less.

The present adhesive sheet can fill a step of on the order of 100 μm maximum.

<Image Display Device>

The present adhesive sheet can be used suitably in an image display device having a constitutive member for display device provided with a stepped portion.

For instance, in an image display device provided with at least two facing constitutive members for display device, at least one constitutive member for display device having on the laminating surface a stepped portion of 50 to 100 μm in height and a flat surface portion, and the gap formed together by the flat surface portions of the two facing constitutive members for display device being 250 μm or less, an image display device can be constituted, provided with a constitution comprising the two constitutive members for display device laminated through the adhesive sheet for image display device.

In so doing, as a constitutive member for display device having on the laminating surface a stepped portion of 50 to 100 μm in height and a flat surface portion, for instance, a constitutive member for display device such as a protective panel having a constitution in which a frame-shaped masking printed portion is formed in the periphery can be cited. Further, a surface protective panel of the touch-on-lens type, in which a touch panel function is integrated, can also be used.

Meanwhile, as constitutive members for display device to be laminated thereto, for instance, touch panels, image display panels, and the like, can be cited.

As the image display panels, in addition to liquid crystal panels having a constitution in which a liquid crystal layer is sandwiched by glass substrates, those having a constitution in which a polarization film has been layered on the viewing side of the liquid crystal panel in order to prevent a decrease in picture quality due to surface reflection, and the like, can be cited.

Further, image display panels of the in-cell types with a touch sensor function built into the pixels of the liquid crystal, in addition to on-cell types with a touch panel built-in within the image display panel, can also be used.

<Explanation of Terms>

In general, "film" refers to a thin and flat product, of which the thickness is extremely small compared to the length and width, maximum thickness being arbitrarily limited, and provided in general in the form of a roll (Japanese Industrial Standard JIS K6900), and in general, "sheet", by definition under JIS, refers to a product that is thin, of which the thickness is small compared given the length and width. However, the boundary between a sheet and a film is not certain, and since there is no need in the present invention to discriminate the two in wording, in the present invention, "sheet" is deemed included even when referring to "film", and "film" is deemed included even when referring to "sheet".

In the present invention, when the statement "X to Y" (X and Y are any numbers) is made, unless expressly stated otherwise, along with the meaning of "X or greater but Y or less", the meanings of "preferably larger than X" and "preferably smaller than Y" are included.

In addition, when the statement "X or greater" (X is any number) is made, unless expressly stated otherwise, the meaning of "preferably larger than X" is included, and when the statement "Y or less" (Y is any number) is made, unless expressly stated otherwise, the meaning of "preferably smaller than Y" is included.

EXAMPLES

Hereafter, description will be given in further details by way of examples and comparative examples; however, the present invention is not to be limited by these.

<Production of Constitutive Members>

First, constitutive members for fabricating the adhesive sheets 1 to 5 described below were produced in the following manner.

(Layered Sheet 1 for Middle Resin Layer Formation)

An acrylic acid ester copolymer A (Mw=440,000; Mn=62,000; Mw/Mn=8; theoretical Tg: −50° C.) was prepared, comprising 75 parts by mass of 2-ethylhexyl acrylate (homopolymer Tg (glass transition point of a polymer comprising 2-ethylhexyl acrylate alone, which has been polymerized): −70° C.), 20 parts by mass of vinyl acetate (homopolymer Tg: +32° C.), and 5 parts by mass of acrylic acid (homopolymer Tg: +106° C.), which were random-copolymerized.

Mixed to 1 kg of this acrylic acid ester copolymer A were 100 g of the UV-curing resin propoxylated pentaerythritol triacrylate ("ATM-4PL", manufactured by Shin-Nakamura Chemical Co., Ltd.) as a crosslinking agent and 15 g of 4-methyl benzophenone as a photopolymerization initiator to prepare a middle resin layer composition (A-1).

Onto a polyethylene terephthalate film ("NP75Z01", a PET film manufactured by Panac Corporation; thickness: 75 μm), of which one side was treated to be releasable, the middle resin layer composition (A-1) was heat-melted and coated on this side with an applicator so as to become 110 μm in thickness and then laid over a polyethylene terephthalate film ("E7006", a PET film manufactured by Toyobo Co., Ltd.; thickness: 38 μm), of which one side was treated to be releasable, so as to come in contact with this side, to produce a layered sheet 1 for middle resin layer formation comprising PET film/UV-crosslinking middle resin layer (A-1; thickness: 120 μm)/PET film.

(Layered Sheet 2 for Middle Resin Layer Formation)

A middle resin layer composition (A-2) was prepared similarly to the middle resin layer composition (A-1), except that 200 g of trimethylolpropane triacrylate as a crosslinking agent and 15 g of 1-hydroxy-cyclohexyl phenyl ketone as a photopolymerization initiator were mixed.

Onto a polyethylene terephthalate film ("NP75Z01", a PET film manufactured by Panac Corporation; thickness: 75 µm), of which one side was treated to be releasable, the middle resin layer composition (A-2) was heat-melted and coated on this side with an applicator so as to become 130 µm in thickness and then laid over a polyethylene terephthalate film ("E7006", a PET film manufactured by Toyobo Co., Ltd.; thickness: 38 µm), of which one side was treated to be releasable, so as to come in contact with this side, to produce a layered sheet 2 for middle resin layer formation comprising PET film/UV-crosslinking middle resin layer (A-2; thickness: 130 µm)/PET film.

(Layered Sheet 1 for Adhesive Layer Formation)

To 1 kg of the acrylic acid ester copolymer A, 20 g of 4-methyl benzophenone was added and mixed as a photopolymerization initiator to prepare an adhesive composition (B-1).

Onto a polyethylene terephthalate film ("MRA75", a PET film manufactured by Mitsubishi Plastics; thickness: 75 µm), of which one side was treated to be releasable, the adhesive composition (B-1) was heat-melted, coated and formed into sheet-form in such a way that the thickness was 60 µm over this side and laid over a polyethylene terephthalate film ("E7006", a PET film manufactured by Toyobo Co., Ltd.; thickness: 38 µm), of which one side was treated to be releasable, so as to come in contact with this side, to produce a layered sheet 1 for adhesive layer formation comprising PET film/UV-crosslinking adhesive layer (B-1; thickness: 60 µm)/PET film.

(Layered Sheet 1' for Adhesive Layer Formation)

A layered sheet 1' for adhesive layer formation comprising PET film/UV-crosslinking adhesive layer (B-1'; thickness: 60 µm)/PET film was produced similarly to the layered sheet 1 for adhesive layer formation except that the coating substrate was changed to polyethylene terephthalate film ("MRF50", a PET film manufactured by Mitsubishi Plastics; thickness: 50 µm) of which one side was treated to be releasable.

<Production of Adhesive Sheet 1>

The PET films on both sides of the middle resin layer (A-1) in the layered sheet 1 for middle resin layer formation were sequentially peeled and removed while PET films on one side of the adhesive layers (B-1) and (B-1') in the layered sheets 1 and 1' for adhesive layer formation were peeled and the exposed adhesive faces were sequentially laminated onto both surfaces of (A-1) with a laminator to produce a multilayered adhesive sheet comprising (B-1)/(A-1)/(B-1').

Through the polyethylene terephthalate films remaining on the surfaces of (B-1) and (B-1'), UV-light was irradiated with a high-pressure mercury lamp so that the integrated amount of light at 365 nm wavelength was 1,000 mJ/cm$^2$, and (B-1), (A-1) and (B-1') were let to UV-crosslink, producing a pre-secondary curing transparent double-sided adhesive sheet 1 with a uniform thickness (total thickness: 240 µm).

<Production of Adhesive Sheet 2>

Over a release-treated polyethylene terephthalate film ("MRA75", a PET film manufactured by Mitsubishi Plastics; thickness: 75 µm), the middle resin layer composition (A-2) and the adhesive composition (B-1) were co-extruded so as to comprise adhesive layer (B-1)/middle resin layer (A-2)/adhesive layer (B-1), coated and formed so as to comprise adhesive layer (B-1)/middle resin layer (A-2)/adhesive layer (B-1)=60/40/60 µm and overlaid with a release-treated polyethylene terephthalate film ("MRA50", a PET film manufactured by Mitsubishi Plastics; thickness: 50 µm) to form a multilayered sheet comprising PET film/(B-1)/(A-2)/(B-1)/PET film.

From one polyethylene terephthalate film side, UV-light was irradiated with a high-pressure mercury lamp so that the integrated amount of light at 365 nm wavelength was 1,000 mJ/cm$^2$, and (B-1), (A-2) and (B-1) were let to UV-crosslink, producing a pre-secondary curing transparent double-sided adhesive sheet 2 with a uniform thickness (total thickness: 160 µm).

<Production of Adhesive Sheet 3>

To 1 kg of the acrylic acid ester copolymer A, 50 g of nonanediol diacrylate as a crosslinking agent and 10 g of 4-methyl benzophenone as a photopolymerization initiator were added and mixed to prepare an adhesive composition (B-3).

This adhesive composition was heat-melted, coated and formed into a film with an applicator so as to become 170 µm in thickness over a release-treated polyethylene terephthalate film ("MRF75", a PET film manufactured by Mitsubishi Plastics; thickness: 75 µm) and a release-treated polyethylene terephthalate film ("MRA50", a PET film manufactured by Mitsubishi Plastics; thickness: 50 µm) was overlaid to produce a sheet comprising PET film/adhesive layer (B-3)/PET film.

From one polyethylene terephthalate film side, UV-light was irradiated with a high-pressure mercury lamp so that the integrated amount of light at 365 nm wavelength was 800 mJ/cm$^2$, and (B-3) was let to UV-crosslink, producing a pre-secondary curing transparent double-sided adhesive sheet 3 with a uniform thickness (total thickness: 170 µm).

<Production of Adhesive Sheet 4>

To 1 kg of the acrylic acid ester copolymer, 100 g of hydrogenated rosin ester ("PINECRYSTAL KE604", manufactured by Arakawa Chemical Industries, Ltd.) and 20 g of a mixture of 4-methyl benzophenone and 2,4,6-trimethyl benzophenone ("ESACURE TZT", manufactured by Lamberti) as a photopolymerization initiator were added and mixed to adjust an adhesive composition. This adhesive composition was coated and formed into a film with an applicator so as to become 150 µm-thick over a release-treated polyethylene terephthalate film ("MRA75", a PET film manufactured by Mitsubishi Plastics; thickness: 75 µm), and overlaid with a release-treated polyethylene terephthalate film ("MRF50", a PET film manufactured by Mitsubishi Plastics; thickness: 50 µm).

From one polyethylene terephthalate film side, UV-light was irradiated with a high-pressure mercury lamp so that the integrated amount of light at 365 nm wavelength was 1,000 mJ/cm$^2$, and the adhesive composition was let to UV-crosslink, producing a pre-secondary curing transparent double-sided adhesive sheet 4 with a uniform thickness (total thickness: 150 µm).

<Production of Adhesive Sheet 5>

An acrylic acid ester copolymer (Mw=1,000,000, theoretical Tg: −61° C.) was prepared, comprising 48 parts by mass of 2-ethylhexyl acrylate, 50 parts by mass of 2-methoxyethyl acrylate (homopolymer Tg: −50° C.) and 2 parts by mass of 4-hydroxybutyl acrylate (homopolymer Tg: −80° C.), which have been random-copolymerized.

With respect to 1 kg of this acrylic acid ester copolymer, 0.2 parts by mass in solid contents of adduct-type hexamethylene diisocyanate ("DURANATE P301-75E", manufactured by Asahi Kasei) was added as a crosslinking agent to produce an adhesive material composition.

Over a release-treated polyethylene terephthalate film ("MRA75", a PET film manufactured by Mitsubishi Plastics; thickness: 75 μm), the adhesive composition was coated, formed and dried, then, overlaid with a release-treated polyethylene terephthalate film ("MRF50", a PET film manufactured by Mitsubishi Plastics; thickness: 50 μm), and cured for one week under the conditions of 25° C. in temperature and 50% humidity to be crosslinked, producing a transparent double-sided adhesive sheet 5 with a uniform thickness (total thickness: 150 μm).

<Production of Adhesive Sheet 6>

Over a release-treated polyethylene terephthalate film ("MRA75", a PET film manufactured by Mitsubishi Plastics; thickness: 75 μm), an acrylic acid ester copolymer (Mw=160,000) comprising 87 parts by mass of 2-ethylhexyl acrylate, 12 parts by mass of acrylic acid and one part by mass of 4-acryloyloxy benzophenone, which were random-copolymerized, was coated and formed so that the thickness was 150 μm, then, a release-treated polyethylene terephthalate film ("MRF50", a PET film manufactured by Mitsubishi Plastics; thickness: 50 μm) was overlaid to produce a adhesive sheet 6 with a uniform thickness (total thickness: 150 μm).

<Evaluation>

For the adhesive sheets 1 to 6 obtained as described above, the following evaluations were carried out.

(Cut-Processability/Storage Stability Evaluation)

With the release films still layered, the adhesive sheets 1 to 6 were cut using a Thompson die-cutter into 100 sheets with a 55 mm×85 mm Thompson blade. The shapes of the edges were observed immediately after the cutting and after storing 100 sheets of cut product for one week under the environment of 25° C. and 50% humidity.

Those for which glue flashes and crushing of the edges were observed in ten or more sheets immediately after laminating or after storage were evaluated as "cross (fail)", and those for which there were no glue flashes and no crushing of the edges in ten or more sheets were assessed as "circle (pass)".

(Print-Step-Following Ability Test)

At the periphery of a 60 mm×90 mm×thickness 0.5 mm soda lime glass, a 10 mm-wide, 80 μm-thick white print (total light transmittance: 0%) was applied to produce an evaluation glass substrate having an 80 μm printed step in the periphery. This evaluation glass substrate is a substitute for an image display device constitutive member having on the laminating surface a stepped portion of 50 μm to 100 μm in height and a flat surface portion.

Produced as a test adherend to be laminated onto this evaluation glass substrate was one in which a polarizer ("NWF-KDSEGHC-ST22", manufactured by Nitto Denko Corp.) serving as an image display device constitutive member has been pre-laminated over the entire surface on one side of a glass plate (60×90 mm×t 0.5 mm).

On the adhesive sheets 1 to 6 that were cut in the processability evaluation, one release film was peeled and the exposed adhesive face was adhered with a hand roller so as to cover the print-stepped portion of the glass substrate. Next, the remaining release film was peeled, an untreated soda lime glass was press-laminated against the exposed adhesive side under reduced pressure (absolute pressure: 5 kPa) and then finish-bonded by performing an autoclave treatment (60° C.; 0.2 MPa; 20 minutes) to produce a laminate for print-step-following ability evaluation.

The laminates for print-step-following ability evaluation were left alone for one day in a normal state (temperature: 23° C.; humidity: 50%), then, the external appearance was visually observed, and those in which lifting or peeling of the adhesive sheet arose near a printed step were evaluated as "cross (fail)" and those without lifting or peeling were evaluated as "circle (pass)".

(Bubbling Resistance Test)

For the laminates for print-step-following ability evaluation produced similarly to the print-step-following ability test, through the printed glass substrate, UV-irradiation was performed on the adhesive sheets 1 to 6 so that UV light at 365 nm reached 2,000 mJ/cm² in integrated amount of light to UV-crosslink (secondary curing) the adhesive sheet of the open portion on the inside enclosed by the printed portion, producing a bubbling resistance test sample.

Each sample was left alone for one day in a normal state (temperature: 23° C.; humidity: 50%) then cured for 6 hours in a thermo-humidistat at 85° C. in temperature and 25% humidity, and the external appearance after curing was observed visually.

Those in which new lifting or bubbling arose after curing were evaluated as "cross (fail)" and those in which no new lifting or bubbling arose were evaluated as "circle (pass)".

(Gel Fraction)

For the laminates for print-step-following ability evaluation produced similarly to the print-step-following ability test, the glass substrate with the print and the glass with the polarizer were separated by impregnating in liquid nitrogen to solidify by cooling the adhesive material (that is to say, the adhesive sheets 1 to 6). In contact with the stepped portion and the flat surface portion of the glass substrate with the print, the adhesive materials (that is to say, the adhesive sheets 1 to 6) at the respective positions were collected to measure the gel fraction (a) of the under-the-step portion and the gel fraction (b) of the under-flat-surface portion by the following method.

Among the adhesive materials (that is to say, the adhesive sheets 1 to 6) described above, portions of the locations in contact with the under-the-step portion and the flat surface portion, each approximately 0.05 g worth, were collected, wrapped into bag-form with an SUS mesh (#200), which mass (X) was measured beforehand, the mouth of the bag was folded shut, the mass (Y) of this bag was measured, then, after being immersed in 100 ml of ethyl acetate and stored in the dark at 23° C. for 24 hours, the bag was taken out, heated at 70° C. for 4.5 hours to evaporate the attached ethyl acetate, the mass (Z) of the dried bag was measured, and the determined masses were substituted into the equation below to determine the gel fraction.

$$\text{gel fraction } [\%] = [(Z-X)/(Y-X)] \times 100$$

TABLE 1

| Adhesive sheet No. | 1 | 2 | 3 | 4 | 5 | 6 |
|---|---|---|---|---|---|---|
| Gel fraction (a) | 63 | 59 | 74 | 10 | 66 | 0 |
| Gel fraction (b) | 80 | 82 | 81 | 71 | 66 | 65 |
| Processability/storage stability | ○ | ○ | ○ | ○ | ○ | x |
| Unevenness-followability | ○ | ○ | ○ | ○ | ○ | ○ |
| Bubbling resistance reliability | ○ | ○ | ○ | ○ | x | ○ |
| Overall evaluation | ○ | ○ | ○ | ○ | x | x |

<Discussion>

By adjusting the thickness of the adhesive sheet to be 250 μm or less and the gel fraction (a) at a position in contact with the stepped portion after laminating to be 10% or greater and smaller than the gel fraction (b) at a position in contact with the flat surface portion, the adhesive sheets 1 to 4 were all found to be able to relieve a distortion arising in the portion in contact with the stepped portion, allowing negative effects on optical properties to be suppressed.

In addition, according to the laminating methods that used the adhesive sheets 1 to 4, since the adhesive composition was primary-cured by UV-crosslinking at the stage of layering onto an image display device constitutive member, there was sufficient flexibility for filling unevenness, such that the printed steps could be followed. Then, after layering, by irradiating UV light through the printed portion (masking portion), although the crosslinking of the portion in contact with the printed portion (masking portion) did not proceed since the UV light was blocked by the printed portion (masking portion), crosslinking of the open portion on the inside enclosed by the printed portion (masking portion) proceeded and secondary-cured, thus, the gel fraction (a) of the position in contact with the stepped portion after laminating became smaller than the gel fraction (b) at the position in contact with the flat surface portion.

Consequently, it was found that both sufficient stress relief at laminating and reliability after laminating could be reconciled in this manner.

In contrast, since the gel fraction at the initial stage was low, the adhesive sheet 5 was excellent in flexibility and excellent in printed step embedding ability; however, without being able to suppress the outgas when the laminate was heated due to being a adhesive sheet with no difference in the gel fraction between the under-print-step portion and the under-flat-surface portion, the bubbling resistance was poor.

In addition, due to being a adhesive sheet with no primary crosslinking and the gel fraction (a) of the under-print-step portion being 0, the adhesive sheet 6 had poor cut-processability, and, readily causing permanent deformation during storage, had poor stability.

KEYS TO THE FIGURES 1 constitutive member for display device
2 adhesive sheet
(1) print-stepped portion
(2) print-stepped portion
(3) flat surface portion
3 constitutive member for display device

The invention claimed is:

1. An image display device, comprising a constitutive member that comprises, on a laminating surface, a stepped portion and a flat surface portion excluding the stepped portion, wherein
the image display device further comprises a UV cured product and a second constitutive member,
the UV cured product is filled in between the constitutive member and the second constitutive member,
the UV cured product is formed by a non-solvent series adhesive composition which does not contain a solvent,
a thickness of a maximum thickness portion of the UV cured product is 250 μm or less,
the UV cured product at a position in contact with the stepped portion has a gel fraction (a) thereof of 10% or greater and smaller than a gel fraction (b) at a position in contact with a flat surface portion, and
the difference [(b)−(a)] between the gel fraction (a) of the UV cured product at a position in contact with the stepped portion and the gel fraction (b) of the UV cured product at a position in contact with the flat surface portion is from 5 to 30%.

2. The image display device according to claim 1, wherein the gel fraction (a) of the UV cured product a position in contact with the stepped portion is from 30 to 80% and the gel fraction (b) of the UV cured product at a position in contact with the flat surface portion is from 35 to 100%.

3. The image display device according to claim 1, wherein the UV cured product comprises a (meth)acrylic acid ester copolymer.

4. The image display device according claim 1, wherein the a UV cured product comprises a (meth)acrylic acid ester copolymer of 100,000 to 700,000 in mass average molecular weight and an intermolecular hydrogen-abstraction type photoinitiator.

5. The image display device according to claim 1,
wherein the constitutive member and the second constitutive member comprise a combination of any from a group comprising a touch panel, an image display panel, and a surface protective panel having a print-stepped portion that blocks light.

* * * * *